May 28, 1968

3,385,824
THERMOSETTING PHENOLIC RESINS PREPARED BY CURING A PHENOL-BENZALDEHYDE CONDENSATE WITH A POLY(HYDROXYALKYL) DIPHENYL OXIDE
Harry A. Smith, Midland, Mich., assignor to The Dow Chemical Company, Midland, Mich., a corporation of Delaware
No Drawing. Filed May 21, 1965, Ser. No. 457,796
6 Claims. (Cl. 260—52)

ABSTRACT OF THE DISCLOSURE

This application is concerned with thermosettable resin composition which comprises a mixture of (a) a thermoplastic phenol-benzaldehyde resin, (b) a poly(hydroxyalkyl) diphenyl oxide having the general formula

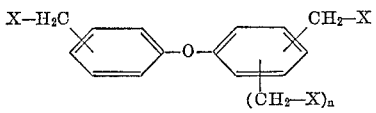

wherein X is hydroxyl and $n$ is an integer from 0 to 1, together with (c) a catalytic amount of an acidic catalyst.

---

This invention relates to the curing of phenol-benzaldehyde resins with poly(hydroxyalkyl) and poly(haloalkyl) diphenyl oxides. More particularly, the invention relates to a thermoset resin and to the method of preparing it from a thermoplastic phenol-benzaldehyde resin.

Phenol-benzaldehyde resins are well known in the art and are useful as casting and coating compounds. Phenol reacts with benzaldehyde to produce a substantially linear resin composed of recurring groups having the following general formula

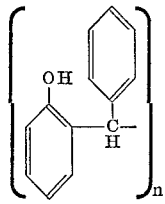

wherein $n$ can have an average value up to about 35, depending upon the reaction conditions used in preparation of the resin.

These resins are thermoplastic owing to their generally linear structure; however, they can be used by further reaction with benzaldehyde to obtain a thermoset product. Thermosetting of these resins in this manner has not been practical for the reason that several hours, typically more than 12 hours, are required to effect a satisfactory cure.

According to this invention, thermoplastic phenol-benzaldehyde resins can be cured by reaction with either poly(hydroxyalkyl) diphenyl oxide or poly(haloalkyl) diphenyl oxide in less time than is required for curing with benzaldehyde and at a lower temperature. The resultant cured products are insoluble, infusible polymers useful in the production of laminates having greatly improved flexural strength. The cure with the poly(hydroxyalkyl) diphenyl oxide and the poly(haloalkyl) diphenyl oxide can be accelerated by the inclusion of a minor amount of a Lewis acid type catalyst, such as zinc chloride.

The poly(hydroxyalkyl) diphenyl and poly(haloalkyl) diphenyl oxides which can be used in the curing of the resins of the present invention are those compounds having the following general formula

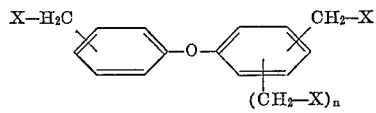

wherein X is selected from the group consisting of hydroxyl and halogen radicals, and $n$ is an integer from 0 to 1. Typical polysubstituted methylated diphenyl oxides particularly useful in the present invention are di(hydroxymethyl) diphenyl oxide, di(chloromethyl) diphenyl oxide and tri(chloromethyl) diphenyl oxide. These materials are preferably utilized in amounts varying from about 1 to about 50 percent, most preferably about 20 to about 50 percent by weight of solids.

The thermoplastic phenol-benzaldehyde resin used in the preparation of the thermoset compositions of the present invention are the soluble, fusible resins obtained by reaction of equimolar amounts of phenol and benzaldehyde for 10 to 20 hours at approximately 150° C. in the presence of an acidic catalyst such as $AlCl_3$, $ZnCl_2$ and the like. The nature and preparation of these resins are fully described in my copending application Ser. No. 340,550, filed Jan. 27, 1964 and now abandoned.

Suitable ionic catalysts include such typical "Lewis" acids such as aluminum chloride, stannic chloride, zinc chloride, boron halides and the like. The amount of catalyst useful in these curing reactions varies from about 0.1 to about 10 percent, preferably from about 0.1 to about 6 percent by weight of the solids.

The resin forming reaction is preferably accomplished by combining the reactants together in the presence of the above-noted catalysts and heating. Temperatures used in the reaction generally vary from about 85° C. to about 200° C., and more preferably from about 100° C. to 175° C. It is sometimes preferable to conduct the reaction in the presence of inert solvents, such as acetone, toluene, bromobenzene, dimethyl formamide and the like. When solvents are used, the reaction temperature is preferably at or above the boiling point of the solvent.

The following examples are intended to illustrate typically suitable compositions and the products obtained thereby, but it is to be understood that the examples do not represent the defining limits of the invention which have been set forth herein above and are included in the appended claims.

Example 1

To a 250 ml. round bottom flask equipped with an air condenser were charged 23.5 grams (0.250 mole) of phenol, 26.5 grams (0.250 mole) of benzaldehyde and 1.4 grams (0.01 mole) of zinc chloride. The temperature of the reaction mixture was raised to 150° C. and the mixture heated for 20 hours. The reaction mixture was then cooled and air dried. 42.1 grams of a fusible, reddish brown, glass-like material was obtained in 82 percent yield which had a melting point range of 200°–230° C. This material was soluble in alkaline aqueous ethanol, ethanol, methylene chloride, acetone, toluene and benzene but was insoluble in water, alkali or acid. This thermoplastic resin was used in preparations of the following examples of the present invention.

Example 2

A mixture was prepared comprising 20 grams of a thermoplastic phenol-benzaldehyde resin having a molar ratio of phenol to benzaldehyde of 1:1, 1.4 grams (0.010 mole) of $ZnCl_2$; and 11.5 grams (0.050 mole) of dihydroxymethyldiphenyl oxide. The mixture was heated in a suitable reaction vessel at 150° C. Gelation was complete in 15 minutes and the sample was cured in 25 minutes. The resultant cured product represented a 100 percent yield of an insoluble, infusible polymer.

Example 3

Several mixtures were prepared comprising 20 grams of the phenol-benzaldehyde prepared in Example 1; 1.4 grams (0.010 mole) of $ZnCl_2$; and 15.8 grams (0.050 mole) of tri(chloromethyl) diphenyl oxide. Approximately 5 to 15 ml. of a solvent boiling at 110° C. to 155° C. such as dimethyl formamide (DMF), bromobenzene, and toluene was added to the mixture and heated. Cure times of 24 to 45 minutes were obtained with the DMF mixture at 150° C. With bromobenzene, cure times of 10 to 30 minutes were obtained at 150° C. A cure time of 14 minutes with toluene was obtained at 110° C. All curing reactions had 100 percent yields of insoluble, infusible products.

Example 4

A mixture was prepared comprising 35.0 grams of the phenol-benzaldehyde resin of Example 1; 6.7 grams of di(chloromethyl) diphenyl oxide; and 1.4 grams of $ZnCl_2$ in 100 ml. of acetone. The resulting mixture contained 35.2 percent solids. A web of woven glass fibers finished with an amine silane coupling agent was impregnated with the resin solution, then air dried to remove the acetone. A 12 ply laminate was built up and cured in a press for 12 hours at 100° C. and 1000 pounds per square inch (p.s.i.) pressure. The cured material was then tested with the following results:

Appearance—red-brown smooth laminate with no blow holes.

Content—20 percent resin and 80 percent glass.

| Strength Tests | Flexural Strength (p.s.i.) | Flexural Modulus (p.s.i.) |
| --- | --- | --- |
| 12-ply at— | | |
| 75° F | 69,000 | 50×10⁶ |
| 700° F | 8,000 | |

The flexural strength test was conducted in accordance with ASTM-D790-61.

I claim:

1. A thermosettable resin comprising a mixture containing (a) a thermoplastic phenol-benzaldehyde resin prepared by reacting equimolar amounts of phenol and benzaldehyde for 10–20 hours at approximately 150° C. in the presence of an acidic catalyst and (b) a poly(hydroxyalkyl) diphenyl oxide having the general formula

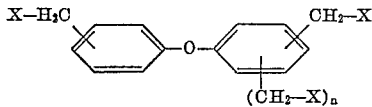

wherein X is hydroxyl and $n$ is an integer from 0 to 1, together with (c) a catalytic amount of an acidic catalyst.

2. The thermosettable resin of claim 1 wherein the poly(hydroxyalkyl) diphenyl oxide is di(hydroxymethyl) diphenyl oxide.

3. The method of curing a thermoplastic phenol-benzaldehyde resin prepared by reactin equimolar amounts of phenol and benzaldehyde for 10–20 hours at approximately 150° C. in the presence of an acidic catalyst to produce a thermoset composition comprising: mixing a quantity of said thermoplastic resin with from about 1 to 50 percent by weight of a poly(hydroxyalkyl) diphenyl oxide having the general formula

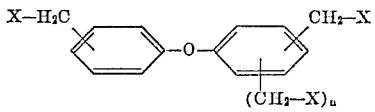

wherein X is hydroxyl and $n$ is an integer from 0 to 1; mixing a catalytic amount of a "Lewis" acid catalyst therewith; and heating said mixture at an elevated temperature until said mixture becomes thermoset.

4. The method of claim 3 wherein the thermoplastic resin is mixed with about 20 to 50 percent by weight of di(hydroxymethyl) diphenyl oxide.

5. The method of claim 3 wherein the thermoplastic resin is mixed with about 20 to 50 percent by weight of di(hydroxymethyl) diphenyl oxide, and the "Lewis" acid catalyst is zinc chloride.

6. A thermosettable composition which comprises a curable unreacted mixture which is curable in the presence of a minor amount of a "Lewis" acid catalyst and at a temperature of about 85° to 200° C. which mixture contains as essential components a thermoplastic phenol-benzaldehyde resin prepared by reacting equimolar amounts of phenol and benzaldehyde for 10–20 hours at approximately 150° C. in the presence of an acidic catalyst and from about 1 to 50 percent by weight of di(hydroxymethyl) diphenyl oxide.

References Cited

UNITED STATES PATENTS 3,169,939  2/1965  Cordts et al. _____ 260—38

OTHER REFERENCES

Modern Plastics, Barron, 1949, pp. 270–276 and 278.
Chemistry of Commercial Plastics, Wakeman, 1947, pp. 122–123 and 141–143.
Phenolic Resins, Gould, 1959, pp. 108–113.

WILLIAM H. SHORT, *Primary Examiner.*

H. S. CHAIN, *Assistant Examiner.*